US009525707B2

(12) United States Patent
Bean et al.

(10) Patent No.: US 9,525,707 B2
(45) Date of Patent: Dec. 20, 2016

(54) INCIDENT RESPONSE TOOL USING A DATA EXCHANGE LAYER SYSTEM

(71) Applicants: James Bean, Santa Clara, CA (US); Torry B. Campbell, Santa Clara, CA (US); Jonathan B. King, Forest Grove, OR (US)

(72) Inventors: James Bean, Santa Clara, CA (US); Torry B. Campbell, Santa Clara, CA (US); Jonathan B. King, Forest Grove, OR (US)

(73) Assignee: McAfee, Inc., Santa Clara, CA (US)

( * ) Notice: Subject to any disclaimer, the term of this patent is extended or adjusted under 35 U.S.C. 154(b) by 91 days.

(21) Appl. No.: 14/580,898

(22) Filed: Dec. 23, 2014

(65) Prior Publication Data

US 2016/0182566 A1 Jun. 23, 2016

(51) Int. Cl.
*H04L 29/06* (2006.01)

(52) U.S. Cl.
CPC .......... *H04L 63/20* (2013.01); *H04L 63/1425* (2013.01); *H04L 63/1441* (2013.01)

(58) Field of Classification Search
CPC ... H04L 63/20; H04L 63/1425; H04L 63/1441
USPC .............................................. 926/22; 726/22
See application file for complete search history.

(56) References Cited

U.S. PATENT DOCUMENTS

| 6,453,356 B1 | 9/2002 | Sheard et al. | |
|---|---|---|---|
| 6,681,327 B1 * | 1/2004 | Jardin | H04L 29/06 713/153 |
| 6,971,106 B1 | 11/2005 | Nakamura et al. | |
| 2001/0005883 A1 * | 6/2001 | Wray | H04L 9/0844 713/151 |
| 2003/0188189 A1 | 10/2003 | Desai et al. | |
| 2006/0010487 A1 * | 1/2006 | Fierer | G06F 21/32 726/5 |
| 2007/0180493 A1 * | 8/2007 | Croft | G06F 3/1415 726/2 |
| 2008/0307530 A1 * | 12/2008 | Lee | G06F 21/10 726/26 |
| 2009/0164522 A1 | 6/2009 | Fahey | |
| 2009/0276667 A1 * | 11/2009 | Dopson | G06F 9/5027 714/48 |
| 2010/0318846 A1 | 12/2010 | Sailer et al. | |
| 2014/0223513 A1 * | 8/2014 | Islam | H04L 63/0876 726/4 |

OTHER PUBLICATIONS

International Search Report from PCT application PCT/US2015/062616 mailed on Mar. 14, 2016 (11 pages).

* cited by examiner

*Primary Examiner* — Michael S McNally
(74) *Attorney, Agent, or Firm* — Sutherland Asbill & Brennan LLP

(57) ABSTRACT

This disclosure describes systems, methods, and computer-readable media related to an incident response tool using data exchange layer. In some embodiments, a data collector may be generated by an incident response server. The incident response server may transmit a data collector to multiple broker servers, where each broker server may transmit the data collector to multiple user devices associated with the broker server. The incident response server may receive data from the data collectors executing on the user devices and may analyze the received data.

19 Claims, 6 Drawing Sheets

INCIDENT RESPONSE TOOL USING A DATA EXCHANGE LAYER SYSTEM

TECHNICAL FIELD

This disclosure generally relates to systems and methods for an incident response tool using a data exchange layer system.

BACKGROUND

Reliance on computer systems and devices by people and companies highlights the growing importance of computer security. Computer security may encompass processes and mechanisms by which digital equipment, information, and services are protected from unintended or unauthorized access. User devices, such as computers, laptops, smartphones, tablets, wearable computers, and the like, may require specialized tools to identify problems. The specialized tools may be used to detect and responds to incidents that may be affecting performance or security of the user device. Unfortunately, in a world where speed and connectivity are highly valued, currently available tools may require significant amounts of time to identify and isolate problems on user devices.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodology for an incident response tool in a data exchange layer system. A data exchange layer system may be an open environment or architecture for adaptive security that provides real-time, bi-directional communication between devices to enable efficient and speedy exchange of data at a reduced operational overhead. The incident response tool may leverage the messaging system of the data exchange layer system to communicate with user devices and broker servers efficiently at low latencies. By leveraging the data exchange layer system, the incident response tool may greatly reduce the time required to obtain data (e.g., diagnostic data) from user devices located anywhere within the data exchange layer system. The data exchange layer system allows the incident response tool to be scaled to hundreds of thousands or millions of user devices.

The incident response tool may utilize proactive incident response traps pushed to user devices to determine a current state of the user device through constant monitoring and to be notified when the trap is triggered. In some embodiments, the incident response tool facilitates a streaming view of activity locally on a user device through the generation and maintenance of local cache or histories. The streaming view may include an adjustable period of retention, which may allow incident responders to search into the historical record of the user device to identify activity across large sets of systems without the expense of central processing of the data associated with each user device within the data exchange layer system. In some embodiments, the incident response tool may generate baselines to establish normality of a user device or a group of user devices. Baselines may be generated based on data collected from the user device, either through the local cache or history of the user device or data obtained through one or more collectors of the user device. The baselines may be non-deterministic and used to identify abnormal device or user behavior. Once the abnormal behavior has been identified, further steps may be taken based on other relevant data.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
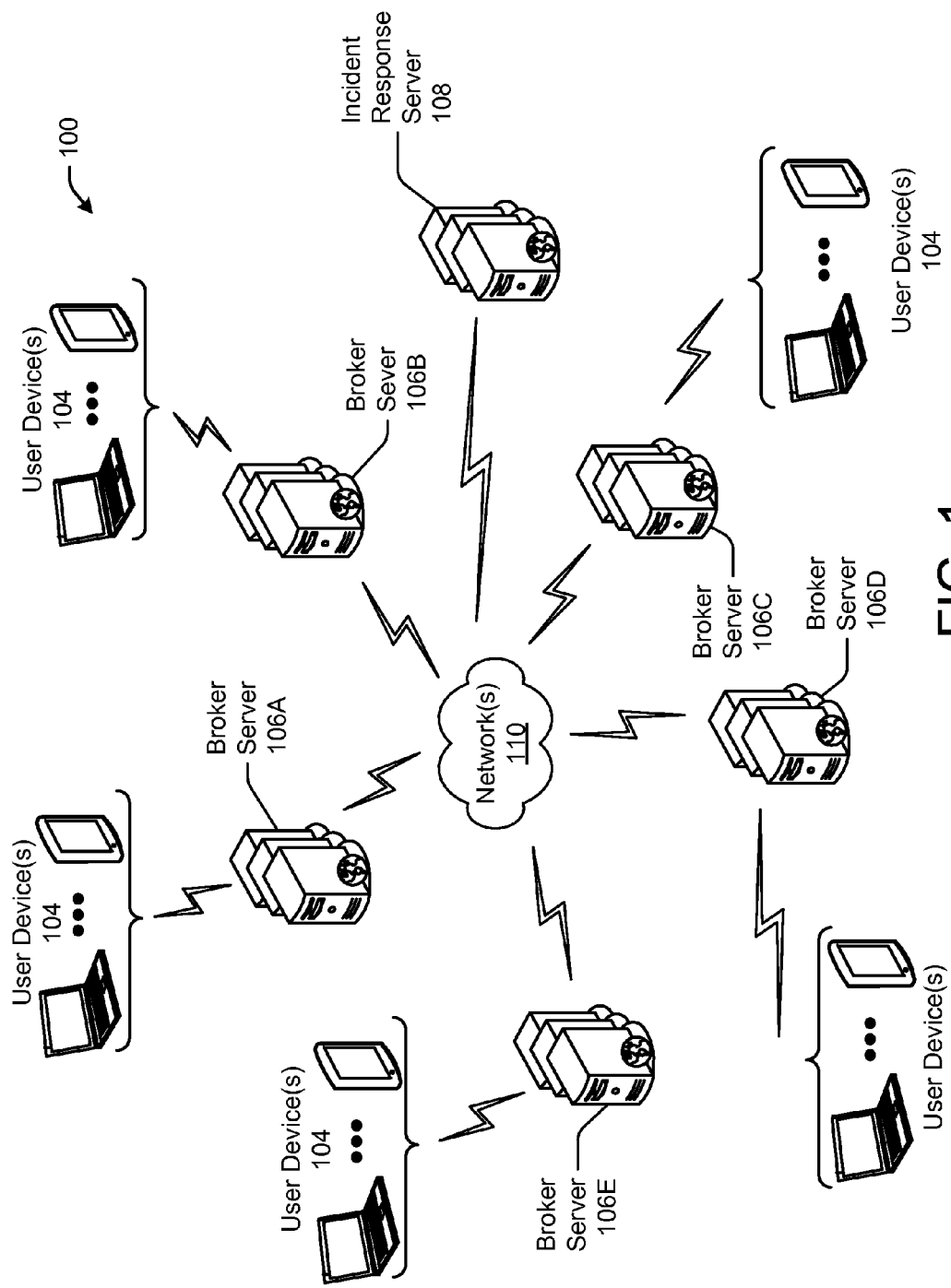
FIG. 1 depicts an illustrative data flow between various components of an illustrative system architecture for an incident response tool using a data exchange layer system in accordance with one or more embodiments of the disclosure.

FIG. 1 depicts an illustrative architecture 100 of various components of a system for an incident response tool using a data exchange layer system in accordance with one or more embodiments of the disclosure. One or more user device(s) 104, one or more broker server(s) 106, and one or more incident response server(s) 108 communicative over one or more network(s) 110 are illustratively depicted in FIG. 1. In some embodiments, a data exchange layer system may be an open environment or architecture for adaptive security that provides real-time, bi-directional communication between devices to enable efficient and speedy exchange of data at a reduced operational overhead. For example, the data exchange layer system may provide a connected messaging system that allows user device(s) 104, broker server(s) 106, and/or incident response server(s) 108 to communicate efficiently at low latencies. In the illustrative architecture 100 depicted in FIG. 1, an incident response server 108 may be in communication with broker server(s) 106A-106E (collectively 106). Each of the brokers may be associated with multiple user device(s) 104. The association of multiple groups of user devices 104 to a broker server 106 and the association of multiple broker servers 106 to an incident response server 108 enables a more efficient mechanism for continuous monitoring of user devices 104 by the system. The incident response server 108 may leverage the messaging capabilities of the data exchange layer system to monitor activity of user devices and proactively detect any incidents using several different features, such as proactive incident response traps, local caches of user device activity, and user device baselines, described in more detail herein.

The user device(s) 104 may include any suitable processor-driven computing device capable of WiFi and non-WiFi access, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 104 may be described herein in the singular; however, it should be appreciated that multiple user device(s) 104 may be provided.

The broker server(s) 106 may include may include any suitable processor-driven computing device including, but not limited to, a desktop computing device, a laptop computing device, a server, a smartphone, a tablet, and so forth. For ease of explanation, the broker server(s) 106 may be described herein in the singular; however, it should be appreciated that multiple broker server(s) 106 may be provided.

The incident response server(s) 108 may include may include any suitable processor-driven computing device including, but not limited to, a desktop computing device, a laptop computing device, a server, a smartphone, a tablet, and so forth. For ease of explanation, the incident response server(s) 108 may be described herein in the singular; however, it should be appreciated that multiple incident response server(s) 108 may be provided.

Figure 2:
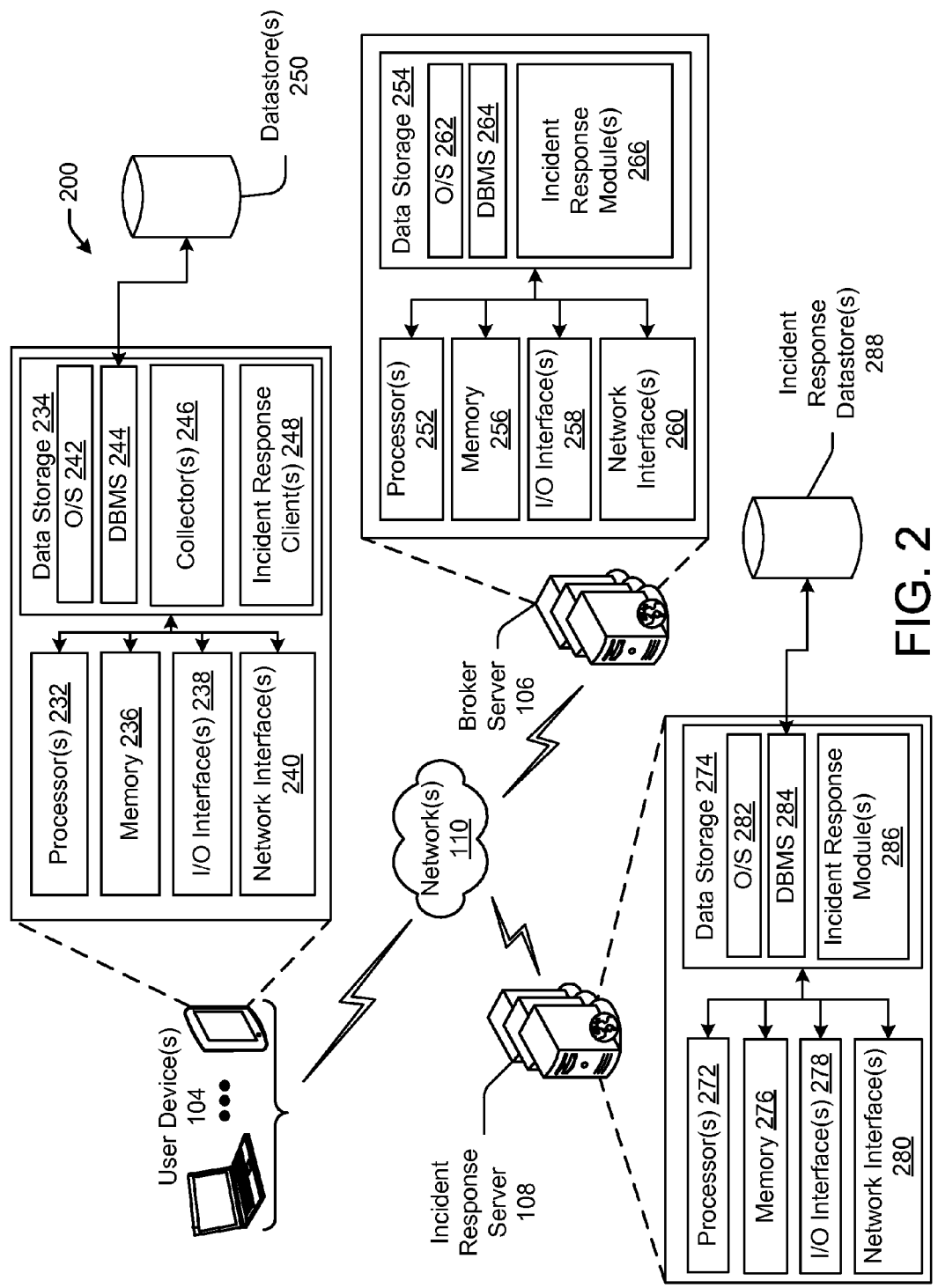
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include multiple user device(s) 104, one or more broker server(s) 106, and/or one or more incident response server(s) 108. The user device(s) 104, broker server(s) 106, and/or incident response server(s) 108 may include any of the types of devices described through reference to FIG. 1.

Any of the user device(s) 104, one or more broker server(s) 106, and/or one or more incident response server(s) 108 may be configured to communicate with each other and any other component of the architecture 200 via one or more network(s) 110. The network(s) 110 may include, but are not limited to, any one or a combination of different types of suitable communications networks such as, for example, cable networks, public networks (e.g., the Internet), private networks, wireless networks, cellular networks, or any other suitable private and/or public networks. Further, the network (s) 110 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the user device(s) 104, one or more broker server(s) 106, and/or one or more incident response server(s) 108 may include one or more communications antennae (not pictured). Communications antenna may be any suitable type of antenna corresponding to the communications protocols used by the user device(s) 104, one or more broker server(s) 106, and/or one or more incident response server(s) 108. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 104.

Any of the user device(s) 104, one or more broker server(s) 106, and/or one or more incident response server(s) 108 may include transmit/receive (transceiver) or radio components may include any suitable radio and/or transceiver for transmitting and/or receiving radio frequency (RF) signals in the bandwidth and/or channels corresponding to the communications protocols utilized by any of the user device(s) 104, one or more broker server(s) 106, and/or one or more incident response server(s) 108 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The user device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from data storage 234 and loaded into memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 104 may further include network interface(s) 240 that facilitate communication between the user device(s) 104 and other devices of the illustrative system architecture 200 or application software via the network(s) 110. The user device(s) 104 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like, may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device 104 and the hardware resources of the user device 104. More specifically, the O/S 242 may include a set of computer-executable instructions for managing the hardware resources of the user device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores 250. The DBMS 244 may use any of a variety of database models (e.g., relational model, object model, etc.) and may support any of a variety of query languages. The one or more datastores 250 may store data collected by one or more collector(s) 246 and/or data generated by the incident response client(s) 248 (e.g., local cache data, baseline data, etc.).

The data storage 234 may additionally include various other program modules that may include computer-executable instructions for supporting a variety of associated functionality. For example, the data storage 234 may include one or more collectors(s) 246 and/or one or more incident response module(s) 248.

The collectors(s) 246 may include computer-executable instructions that in response to execution by the processor(s) 232 cause operations to be performed including collecting data associated with different types of activity on the user device. In some embodiments, the collector(s) 246 may be user-configured collector(s) 246 that are configured by an administrator of the system at the incident response server 108 and then pushed to the user devices 104. User-configured collector(s) 246 may directly collect data or measure activity on the user device 104. In some embodiments, the collector(s) 246 may include persistent collector(s) 104 which may monitor file, process, registry, and/or network activity of a user device 104. The persistent collector(s) 246 may obtain data through direct measurement of activity of the user device 104 or may obtain data from other collector(s) 246. Persistent collector(s) 246 may continuously collect data on the user device 104 without any user intervention.

The incident response client(s) 248 may include computer-executable instructions that in response to execution by the processor(s) 232 cause operations to be performed including communicating with the one or more collector(s) 246, generating a local cache of activity on the user device 104, analyzing any data either measured by the collector(s) 246 or directly from the user device 104, communicating with the associated one or more broker server(s) 106, and the like.

Within the data storage 234, one or more modules may be stored. As used herein, the term module may refer to a functional collection of instructions that may be executed by the one or more processors 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The broker server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from data storage 254 and loaded into memory 256 as needed for execution. The processor(s) 252 may be configured to execute the computer-executable instructions to cause various operations to be performed.

The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into memory 256 as needed for execution. Depending on the configuration and implementation of the broker server(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The broker server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The broker server(s) 106 may further include network interface(s) 260 that facilitate communication between the broker server(s) 106 and other devices of the illustrative system architecture 200 (e.g., user device(s) 104, etc.) or application software via the network(s) 110. The broker server(s) 106 may additionally include one or more input/output (I/O) interfaces 258 (and optionally associated software components such as device drivers) that may support interaction between a user and a variety of (I/O) devices, such as a keyboard, a mouse, a pen, a pointing device, a voice input device, a touch input device, a display, speakers, a camera, a microphone, a printer, and so forth.

Referring again to the data storage 254, various program modules, applications, or the like, may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the broker server(s) 106 and the hardware resources of the broker server(s) 106. More specifically, the O/S 262 may include a set of computer-executable instructions for managing the hardware resources of the broker server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, non-SQL, document models, etc.) and may support any of a variety of query languages.

The data storage 254 may additionally include various other program modules that may include computer-executable instructions for supporting a variety of associated functionality. For example, the data storage 254 may include one or more incident response module(s) 266.

The incident response module(s) 266 may include computer-executable instructions that in response to execution by the processor(s) 252 cause operations to be performed including communicating with one or more associated user device(s) 104, one or more other broker server(s) 106, and/or one or more incident response server(s) 108. In some embodiments, the incident response module(s) 266 may receive data from one or more user device(s) 104 and may process the data (e.g., analyze the data from multiple user device(s) 104 and generate a message to transmit to the incident response server 108, reducing the number of messages that the incident response server 108 receives). In some embodiments, the incident response module(s) 266 may receive messages from the one or more incident response server(s) 108 requesting information. The incident response module(s) 266 may transmit the request for information to one or more user device(s) 104, such as a subset of the associated user device(s) 104 that are likely more relevant to the requested information, such as those that are subscribed to certain topics with the broker server 106. For example, the request for information may be to identify user device(s) 104 that downloaded a mobile application. The incident response module(s) 266 may determine that the relevant user device(s) would be mobile device(s) 104, such as laptops, smartphones, tablets, and/or other wearable computers. The incident response module(s) 266 may send a message for the requested information to user device(s) 104 subscribed to the topic for mobile device(s) and may receive data from the subset of the user device(s) 104.

Within the data storage 254, one or more modules may be stored. As used herein, the term module may refer to a functional collection of instructions that may be executed by the one or more processors 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The incident response server(s) 108 may include one or more processors (processor(s)) 272 and one or more memories 276 (referred to herein generically as memory 276). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from data storage 274 and loaded into memory 276 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into memory 276 as needed for execution. Depending on the configuration and implementation of the incident response server(s) 108, the memory 276 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The incident response server(s) 108 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The incident response server(s) 108 may further include network interface(s) 280 that facilitate communication between the incident response server(s) 108 and other devices of the illustrative system architecture 200 or application software via the network(s) 110. The incident response server(s) 108 may additionally include one or more input/output (I/O) interfaces 278 (and optionally associated software components such as device drivers) that may support interaction between a user and a variety of (I/O) devices, such as a keyboard, a mouse, a pen, a pointing device, a voice input device, a touch input device, a display, speakers, a camera, a microphone, a printer, and so forth.

Referring again to the data storage 274, various program modules, applications, or the like, may be stored therein that may comprise computer-executable instructions that when executed by the processor(s) 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the incident response server(s) 108 and the hardware resources of the incident response server(s) 108. More specifically, the O/S 282 may include a set of computer-executable instructions for managing the hardware resources of the incident response server(s) 108 and for providing common services to other application programs (e.g., managing memory allocation among various application programs). The O/S 282 may include any operating system now known or which may be developed in the future including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores (e.g., incident response data store(s) 288) which may store data generated by the incident response module(s) 286 (e.g., reports, baselines, proactive traps, reactions, etc.). The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more incident response module(s) 286.

The incident response module(s) 286 may include computer-executable instructions that in response to execution by the processor(s) 272 cause operations to be performed including configuring collector(s) 246 to be propagated to user device(s) 104, configuring proactive incident response traps and associated reactions (further described herein) to be propagated to user device(s) 104, initiating queries regarding state information of user device(s) 104, receiving data from broker server(s) 106, analyzing data, generating group baselines for a group of user device(s) 104, generating one or more reports, and the like.

Within the data storage 274, one or more modules may be stored. As used herein, the term module may refer to a functional collection of instructions that may be executed by the one or more processors 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Illustrative Processes

Figure 3:
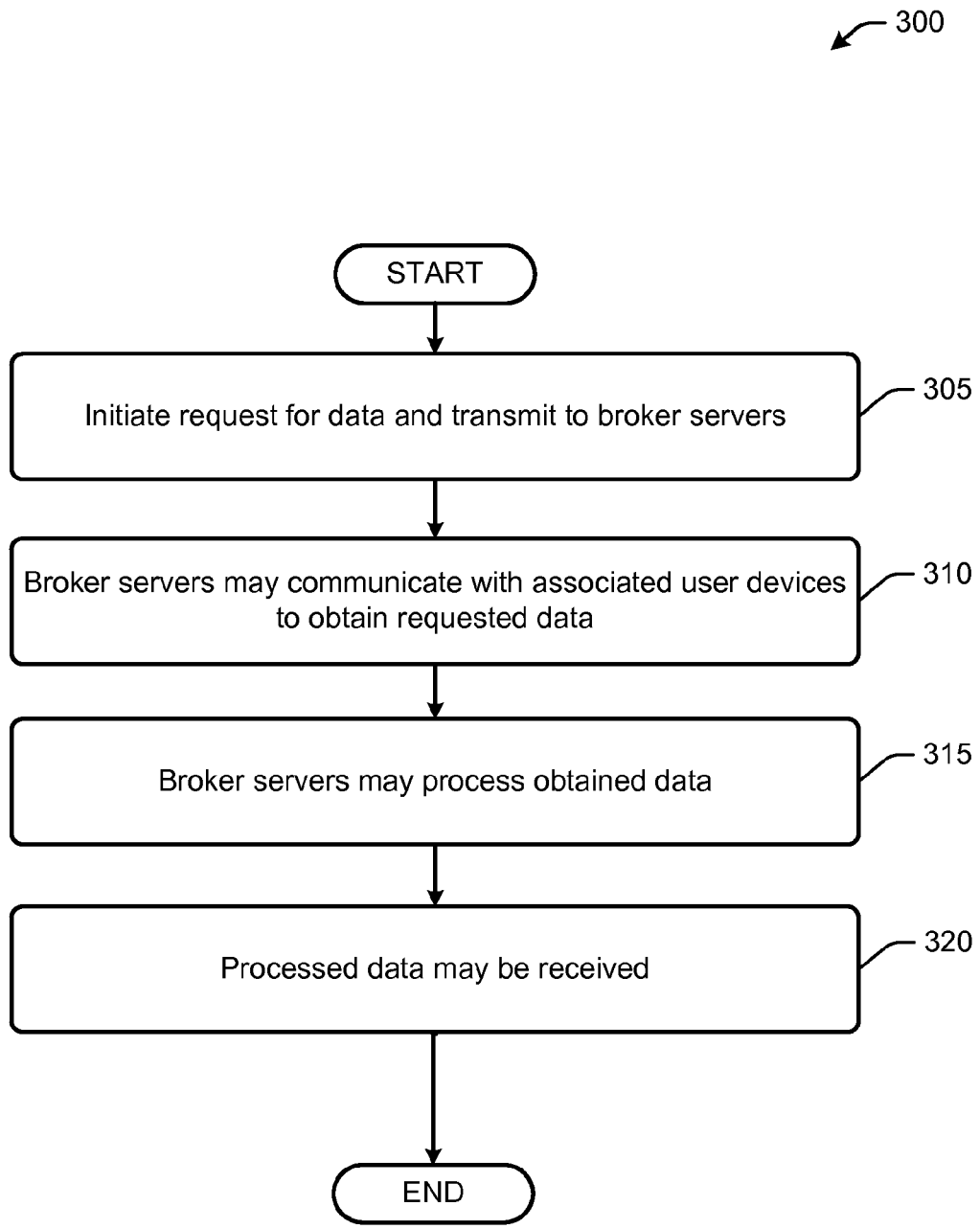
FIG. 3 is a process flow diagram of an illustrative method for an incident response tool in a data exchange layer system communicating with various components in an illustrative system architecture in accordance with one or more embodiments of the disclosure.

FIG. 3 is a process flow diagram of an illustrative method 300 for an incident response tool in data exchange layer communicating with various components in an illustrative system architecture in accordance with one or more embodiments of the disclosure. In some embodiments, the data exchange layer system facilitates scaling the ability to communicate with and obtain data from user devices 104 to hundreds of thousands or millions of collected devices (e.g., user device(s) 104, broker server(s) 106, incident response server(s) 108, etc.). The incident response tool may utilize optional aggregation features by extending broker server(s) 106 to allow a plugin system, where broker server(s) 106 may gather and aggregate messages from user device(s) 104, preventing incident response server 108 to be overwhelmed and inundated with messages from user device(s) 104. Additionally, the distributed computing that may be leveraged by having the user device(s) 104 to analyze collected data and then transmitting the results to broker server(s) 106 and incident response server(s) 108, thereby increasing the efficiency of the system.

At block 305, the incident response module(s) 286 of an incident response server may initiate a request for data and transmit the request to one or more broker server(s) 106. In some embodiments, the request may be generated and transmitted leveraging the data exchange layer system. For example, the data exchange layer system may propagate the request to the devices connected or associated with the data exchange layer system quickly. In some embodiments, messages originating from the incident response server 108 may be sent to one or more broker server(s) 106 for distribution to user device(s) 104. The broker server(s) 106 may transmit received messages to other broker server(s) 106 and/or any associated user device(s) 104. Each broker server(s) 106 that receives a message may transmit the message to user device(s) 104 associated with the respective broker server(s) 106. The request may include one or more parameters for data as specified by an administrator initiating the request. For example, parameters may include characteristics of the user device(s) 104 (e.g., type of device), characteristics of the users of the user device(s) 104 (e.g., membership in a group, role of the user, etc.), or the like. In some embodiments, the incident response server may transmit the request for data to multiple brokers At block 310, the incident response module(s) 266 of a broker server 106 may receive the request from the incident response server 108 and communicate the request to one or more user device(s) 104 associated with the broker server 106 to obtain the requested data. In some embodiments, the incident response module(s) 266 may process the request and identify one or more parameters specified by in the request. In some embodiments, the incident response module(s) 266 may identify one or more topics associated with the identified parameters and transmit the request to the user device(s) 104 subscribed to the topic. User device(s) 104 may subscribe to topics based on configurations set by an administrator of the system or based at least in part on characteristics of the user device 104 or user at time of configuration to operate within the data exchange layer system.

At block 315, the incident response module(s) 266 may receive data from the one or more user device(s) 104 associated with the broker server 106 and process the obtained data. In some embodiments, processing the obtained data may include aggregating the multiple messages containing the requested data from multiple user device(s) 104 and transmitting a single message containing the aggregation of messages and/or data from the user device(s) 104 to the incident response server 108.

At block 320, the incident response module(s) 286 may receive the data processed by the incident response module(s) 266 of one or more broker server(s) 106. The incident response module(s) 286 may receive data from multiple broker server(s) 106 and may process all the data received in response to the request for information. In some embodiments, the request for data may have been related to a single incident which the administrator is investigating. In other embodiments, the request for data may have been related to the generation of individual and/or group baselines for a subset of user device(s) 104. In some embodiments, the incident response module(s) 286 may analyze the data and generate reports. In some embodiments, the incident response module(s) 286 may present the processed data to an administrator who may take further action based at least in part on the processed data.

Figure 4:
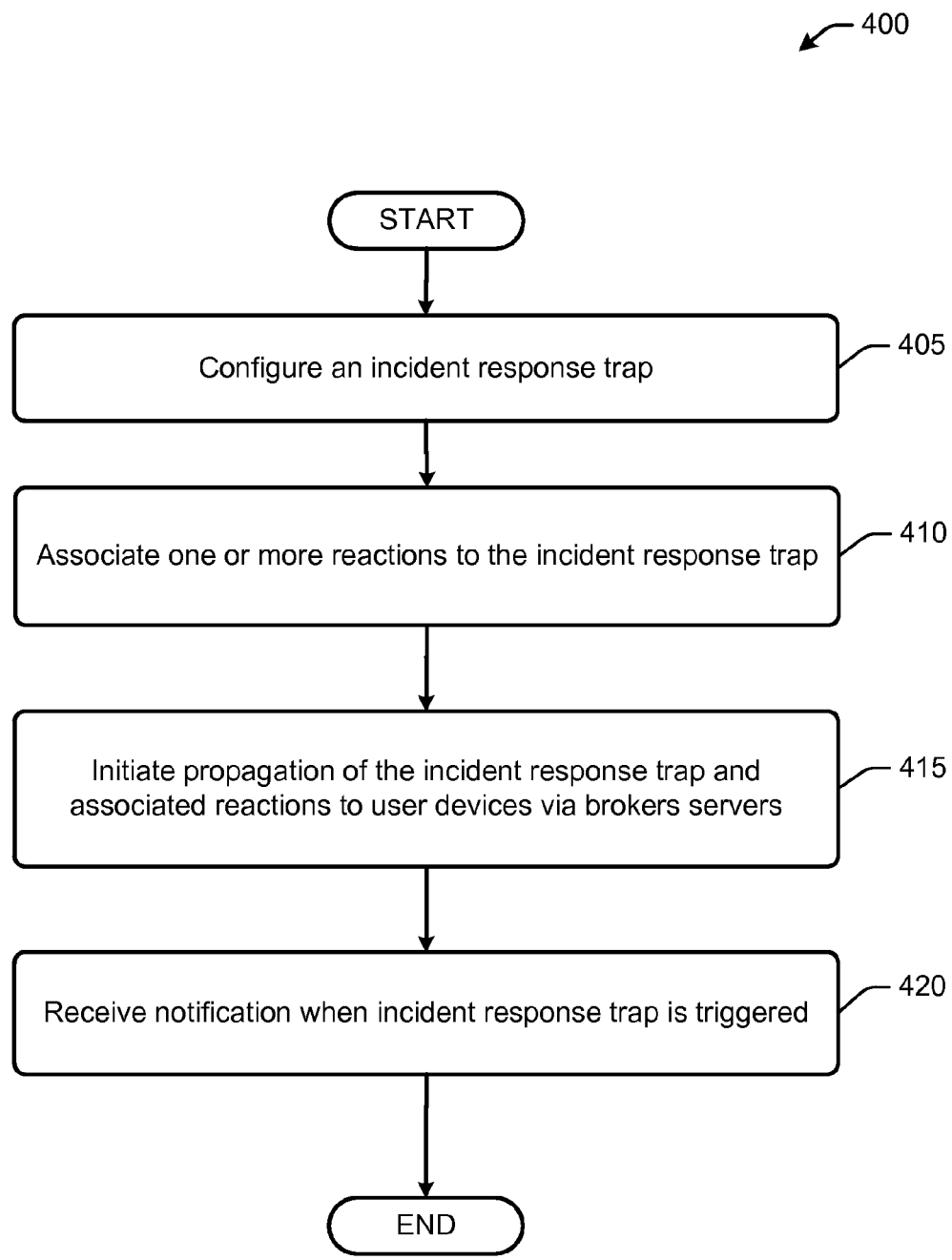
FIG. 4 is a process flow diagram of an illustrative method for proactive traps in an incident response tool in a data exchange layer system in accordance with one or more embodiments of the disclosure.

FIG. 4 is a process flow diagram of an illustrative method 400 for proactive traps in an incident response tool in data exchange layer in accordance with one or more embodiments of the disclosure. In some embodiments, systems may only query the state of a user device 104 periodically, where changes may occur to the user device 104 between queries, causing the potential missing of critical information. Accordingly, proactive incident response traps may be used to monitor the state of user device 104 without worrying about missing information. An incident response trap may generate a proactive notification when the trap condition or set of conditions is triggered. Incident response traps may be used to monitor different types of activity on a user device 104, including but not limited to monitoring, file, network, process, and registry activities.

At block 405, the incident response module(s) 286 of an incident response server 108 may create and configure an incident response trap. An incident response trap may comprise one or more conditional statements for monitoring activity on a user device 104.

At block 410, the incident response module(s) 286 may associate one or more reactions to the incident response trap. A reaction may be any action that may be chained to or otherwise associated with the incident response trap, where once the trap is triggered (e.g., conditional statements have been met), a specified action or actions may be taken. For example, an incident response trap may be configured so that a reaction occurs when an attempt is made by the user device 104 to contact a website designated as untrustworthy. The reaction may be to terminate the process attempting to access the website.

At block 415, the incident response module(s) 286 may initiate propagation of the incident response trap and associated reactions to user devices via broker server(s) 106 of the data exchange layer system. The incident response trap and associated reactions may be pushed to user device(s) 104 in the data exchange layer system by transmitting the incident response trap and associated reactions to one or more broker server(s) 106, which may in turn transmit the incident response trap and associated reactions to one or more user device(s) 104 associated with the broker server 106.

At block 420, the incident response module(s) 286 may receive notification when the incident response trap is triggered. In some embodiments, the notification may indicate a history associated with the incident response trap (e.g., previous events that triggered the trap), data associated with the triggering of the incident response trap (e.g., date, time, event that triggered the trap). In some embodiments, an administrator may take further action in response to the notification, such as increasing monitoring functions for the user device 104 on which the incident response trap was triggered or the like.

Figure 5:
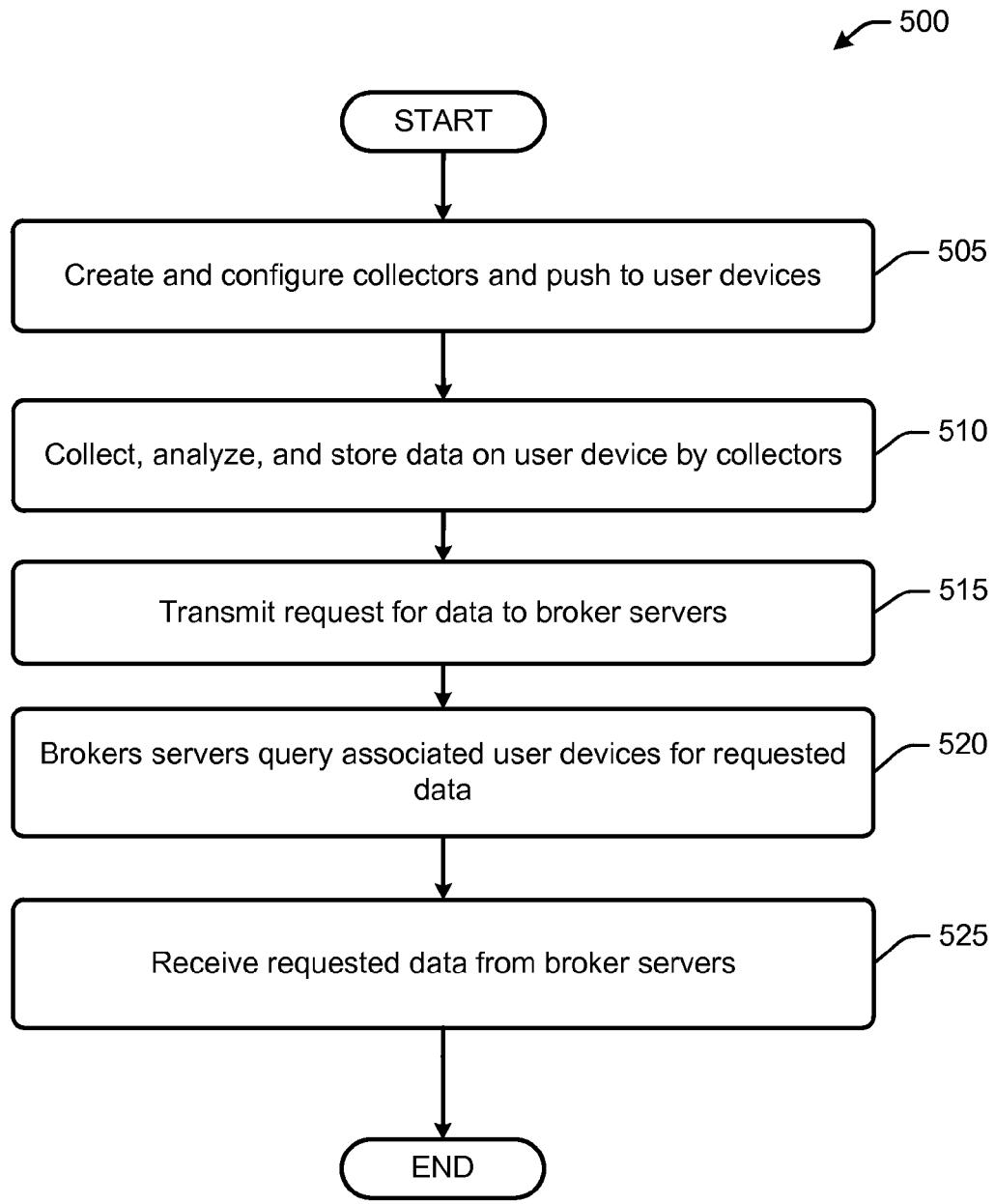
FIG. 5 is a process flow diagram of an illustrative method for local history caches in an incident response tool in a data exchange layer system in accordance with one or more embodiments of the disclosure.

FIG. 5 is a process flow diagram of an illustrative method 500 for local history caches in an incident response tool in data exchange layer in accordance with one or more embodiments of the disclosure. In some embodiments, an incident responder may need recent user device 104 history to accurately identify and assess issues. Local caches or histories on user device(s) 104 may permit the continuous tracking and logging of critical activity locally, which may facilitate speedier and more accurate diagnosis of issues on the user device 104. For example, if network flow data is locally logged on user device(s) 104, an incident responder may query the data exchange layer system to determine which device(s) contacted a particular IP address in the last week and obtain the information quickly, as the information has already been locally cached on the user device(s) and requires only retrieval of such data with requiring further processing to obtain such data.

In another example, an incident responder may wish to determine in a 500,000 node environment, the existence of a particular file on the file system. User device(s) 104 may have one or more persistent collector(s) which may have hashed all the files on the file system (e.g., using MD5, SHA1, or SHA2 algorithms to hash the files) and stored the data in a local cache or history of the user device 104. Persistent collector(s) may be collector(s) 246 that are pushed onto user device(s) 104 when they are associated with the data exchange layer system and may continuously monitor data on user device(s) 104, such as monitor, file, process, registry, and/or network activity of a user device 104. The persistent collector(s) 246 may obtain data through direct measurement of activity of the user device 104 or may obtain data from other collector(s) 246. Persistent collector(s) 246 may continuously collect data on the user device 104 without any user intervention. The incident responder may then initiate a request to determine of a particular file one any of the user devices in the data exchange layer system. As the files have already been hashed by the persistent collector(s) on the user device(s), the incident responder may obtain the requested data immediately, rather than having to wait for the user device 104 to hash all files in its system and then determining whether the requested file exists on the user device 104.

At block 505, the incident response module(s) 286 of an incident response server 108 may create and configure one or more collectors 246 and push a copy of the collector 246 to one or more user device(s) 104. In some embodiments, an administrator may specify the type of data to collect, duration of the collection of data, rules for expunging collected data, and the like. In some embodiments, collector(s) 246 may be designated persistent collectors which may collect all data associated with monitor, file, process, registry, and/or network activity of a user device 104. Persistent collector(s) may obtain data from other collector(s) 246 or directly from the user device 104. The incident response module(s) 286 may facilitate pushing the configured collector(s) 246 to some or all of the user device(s) in the data exchange layer system. Accordingly, the incident response module(s) 286 may transmit a copy of the collector(s) 246 to one or more broker server(s) 106, which may then transmit a copy of the collector(s) 246 to one or more user device(s) 104 associated with the broker server(s) 106.

At block 510, the collector(s) 246 of the user device(s) 104 may collect and store data on the user device(s) in local caches or histories, while the incident response client(s) 248 may receive and respond to requests from incident response server(s) 108 by retrieving data from the local caches or histories, analyzing the local caches or histories, and identifying data relevant to the request.

At block 515, the incident response module(s) 286, may transmit a request for data to one or more broker server(s) 106. The request for data may be received by each of the one or more broker server(s) 106 and processed to identify any parameters specified in the request. For example, the request may indicate data should be obtained from smartphones or tablets. The incident response module(s) 266 on each of the one or more broker server(s) 106 may determine that the identified parameters from the request correspond to one or more topics to which user device(s) 104 subscribe in association with the broker server(s) 106. The incident response module(s) 266 may then transmit the data request to the one or more user device(s) 104 subscribed to the identified topic and may receive data retrieved and analyzed by the incident response client(s) 248 of the user device(s) 104 from the local cache or histories of the user device 104. The incident response module(s) 266 may then aggregate the data received from the one or more user device(s) 104 and transmit a single message to the incident response server 108.

At block 520, the incident response module(s) 286 may receive the requested data from the one or more broker server(s) 106. The incident response module(s) 286 may process the data received from each of the broker server(s) 106 and may use the data obtained from the user device(s) 104 for different purposes, such as identifying details about isolated issues, generating baselines, or the like.

Figure 6:
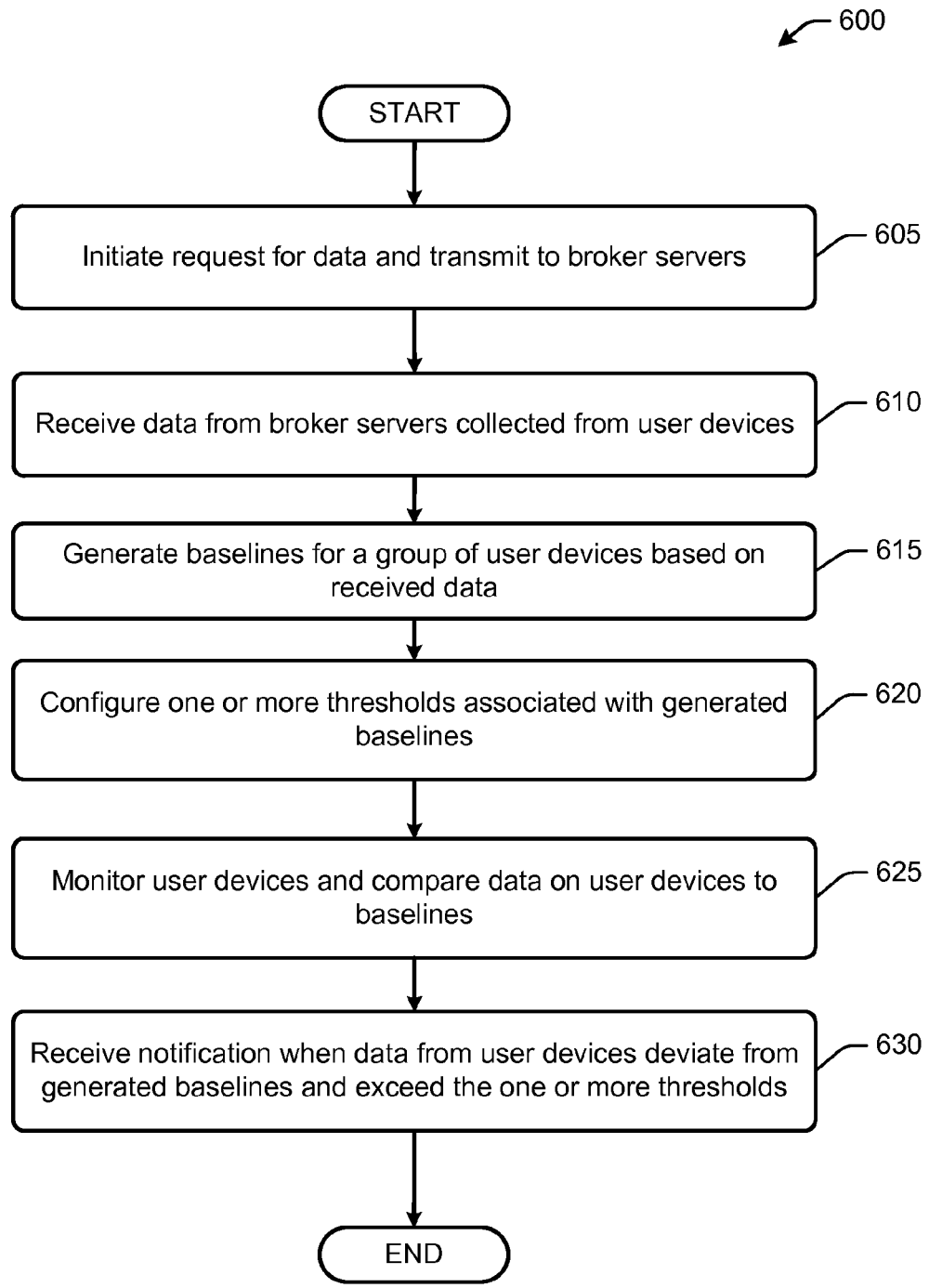
FIG. 6 is a process flow diagram of an illustrative method for baselines in an incident response tool in a data exchange layer system in accordance with one or more embodiments of the disclosure.

FIG. 6 is a process flow diagram of an illustrative method 600 for baselines in an incident response tool in data exchange layer in accordance with one or more embodiments of the disclosure. In some embodiments, baselines are a non-deterministic tool that may be used to establish normality within a system (e.g., user device 104) and may be used to identify abnormal behavior. Baselines may be generated from data stored in the local cache or history of a user device 104 generated and maintained by one or more collector(s) 246. In some embodiments, baselines may be generated and leveraged to identify pattern contrast on individual systems (e.g., user device(s) 104) or user. For example, if two users and their respective systems were analyzed, each user and system would have a unique pattern associated with application usage, browsing activity, interactive logon times, location, and/or software installations. The patterns would likely be different for the two users and their systems, but as individual users, a behavioral pattern would be developed over time (e.g., users may browse a website several times a day, become inactive at certain periods of the day, etc.). By monitoring user activity while logged into a system as well as when they are not interacting with a system patterns may be derived and baselines may be generated. From those baselines patterns can be evaluated for contrast against that data.

At block 605, the incident response module(s) 286 of an incident response server 108 may initiate a request for data and transmit the request to one or more broker server(s) 106. In some embodiments, the request for data may be for a subset of user device(s) 104, such as those associated with a specific group of users, type of user device 104, or the like. The request may be transmitted through the data exchange layer system, wherein the request is transmitted to one or more broker server(s) 106, which may then transmit the message to one or more user device(s) 104 associated with a broker server 106.

At block 610, the incident response module(s) 286 may receive the requested data from one or more broker server(s) 106 collected from one or more user device(s) 104. In some embodiments, the broker server(s) 106 may have transmitted the request to user device(s) 104 subscribed to a topic determined to be associated or relevant to the requested information. In some embodiments, the broker server(s) 106 may act as an intermediary within the data exchange layer system, where the broker server(s) 106 may receive messages from multiple associated user device(s) 104, process the received messages from the user device(s) 104, and generate a single message associated with the received messages from the multiple user device(s) 104 and transmit the message containing the requested data from the user device(s) 104 to the incident response server 108, thus reducing network traffic within the system.

At block 615, incident response module(s) 286 may generate baselines for a group of user devices based on the received data. In some embodiments, the data received from broker server(s) 106 may be individual baselines associated with their respective user device(s) 104. The incident response module(s) 286 may generate one or more baselines associated with the subset or group of user device(s) 104 from which the data was received. In some embodiments, the data received may be data from user device(s) 104 obtained for the respective local cache or history of the user device(s) 104. The incident response module(s) 286 may generate individual baselines for the respective user device(s) 104 and/or one or more group baselines associated with the set of user device(s) 104 from which the data was received.

In some embodiments, the baselines may be computed baselines, wherein data received from user device(s) 104 may be processed and baselines may be generated by computing values for different types of activity. For example, a computed baseline for network activity may calculate on a periodic basis, the number of connections and types of connections based on the protocol. The calculated data may be mapped out and a baseline may be generated based on the calculated values.

At block 620, incident response module(s) 286 may configure one or more thresholds associated with generated baselines. For example, the thresholds may indicate a range of deviation to be used to determine whether a given activity is abnormal. For example, if the baseline indicates logon activity by users between 9:00 AM and 10:00 AM, the threshold may indicate a range of plus or minus thirty minutes of the baseline during which time the activity would still be considered normal. If however, the logon activity occurs outside of the threshold (e.g., 3:00 AM), then such behavior, because it exceeds the configured threshold, may be deemed abnormal behavior.

At block 625, incident response module(s) 286 may monitor user device(s) 104 and compare data on user device(s) 104 to baselines. In some embodiments, the incident response module(s) 286 may monitor the user device(s) 104 through the use of proactive incident response traps (e.g., as describe in relation to FIG. 4) where the baselines (e.g., individual or group) may be used in a conditional statement of the proactive incident response trap to identify abnormal behavior. In some embodiments, an administrator may compare an identified activity or event on a user device 104 to an individual or group baseline to determine if the activity or event is abnormal.

At block 630, incident response module(s) 286 may receive a notification when data from the user device(s) 104 deviates from generated baselines and exceed one or more thresholds. In some embodiments, the notification may be received from the user device(s) 104 (via a broker server 106) in association with a proactive incident response trap or may be received in response to the user device 104 determining an activity or event deviates from the individual baseline associated with the user device 104 and exceeds one or more thresholds configured at block 620. An administrator may choose to further monitor the user device 104 by requesting further data or may take a proactive measure based on the determination that the activity or event on the user device 104 is abnormal.

In one embodiment, a computer-readable medium may store computer-executable instructions which, that when executed by a processor, cause the processor to perform operations comprising configuring, by an incident response server, a data collector that will collect data on a user device where the data collector is stored; transmitting, by the incident response server, a copy of the data collector to a plurality of user devices through a data exchange layer system, wherein the data exchange layer system comprises a plurality of broker servers, each associated with a respective portion of the plurality of user devices; transmitting, by the incident response server, a request for a set of data from the data exchange layer system; and receiving, by the incident response server, the set of data from at least a subset of the plurality of broker servers, wherein the set of data is obtained from the respective copies of the data collector of a subset of user devices associated with the subset of the plurality of broker servers.

In one aspect of an embodiment, the operations may further comprise generating, by the incident response server, a group baseline associated with a group of user devices based on the data received; and configuring, by the incident response server, a threshold associated with the group baseline. In one aspect of an embodiment, the operations may further comprise receiving, by the incident response server, a second set of data from a second user device; processing, by the incident response server, the second set of data to identify an action; determining, by the incident response server, that the action exceeds the threshold associated with the group baseline; generating, by the incident response server, a notification comprising information associated with the action, the threshold, and the group baseline; and facilitating, by the incident response server, presentation of the notification to an administrator of the data exchange layer system. In one aspect of an embodiment, configuring the data collector that will collect data executing on a user device where it is stored may further comprises configuring, by the incident response server, the data collector to generate a local cache of data based on data collected by the data collector and stored on the user device on which the data collector is stored. In one aspect of an embodiment, the set of data from at least the subset of user devices may comprise information from each of the subset of user devices and aggregated by the plurality of broker servers. In one aspect of an embodiment, the operations may further comprise generating, by the incident response server, the request for the set of data from the data exchange layer, where in the request comprises a specification of a topic associated with the subset of user devices. In one aspect of an embodiment, the topic may be a category or parameter by which user devices are grouped or identified.

In one embodiment, a system may comprise at least one memory storing computer-executable instructions; and at least one processor, wherein the at least one processor is configured to access the at least one memory and to execute the computer-executable instructions to configure an incident response trap comprising one or more conditional statements; associate the incident response trap with one or more reactions; facilitate propagation of the incident response trap to user devices via a data exchange layer system comprising a plurality of broker servers, each associated with a plurality of user devices; receive a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and facilitate presentation of the notification to an administrator of the data exchange layer system.

In one aspect of an embodiment, the at least one processor may be further configured to execute the computer-executable instructions to configure a data collector that will collect data on a user device where the data collector is stored; and transmit a copy of the data collector to the user devices through the data exchange layer system. In one aspect of an embodiment, the at least one processor may be further configured to execute the computer-executable instructions to receive data collected by a subset of the user devices, wherein each of the subset of user devices executed a respective copy of the data collector and generates a respective local cache. In one aspect of an embodiment, the at least one processor may be further configured to execute the computer-executable instructions to generating, by the incident response server, a group baseline based on the data collected by the subset of the user devices. In one aspect of an embodiment, the one or more conditional statements of the incident response trap may be associated with file, network, process, or registry activity of at least one of the user devices. In one aspect of an embodiment, the at least one processor may be further configured to execute the computer-executable instructions to initiate a request for a set of data through the data exchange layer system; and receive the set of data from a subset of user devices through the data exchange layer system, wherein the subset of user devices is determined by an association of a topic with the subset of user devices. In one aspect of an embodiment, the at least one processor may be further configured to execute the computer-executable instructions to generate a report based at least in part on the data received from the subset of user devices. In one aspect of an embodiment, the topic may be a category or parameter by which user devices are grouped or identified.

In one embodiment, a method may comprise configuring, by an incident response server, a data collector that will collect data on a user device where the data collector is stored; transmitting, by the incident response server, a copy of the data collector to a plurality of user devices associated with a group through a data exchange layer system, wherein the data exchange layer system comprises a plurality of broker servers, each associated with a respective portion of the plurality of user devices; receiving, by the incident response server through the data exchange layer system, a set of data from each of the plurality of user devices via a subset of the plurality of broker servers, wherein the set of data is obtained from the respective copies of the data collector of each of the plurality of user devices; generating, by the incident response server, a group baseline associated with the group based on the set of data from each of the plurality of user devices; and configuring, by the incident response server, a threshold associated with the group baseline.

In one aspect of an embodiment, the method may further comprise configuring, by the incident response server, an incident response trap comprising a conditional statement and one or more reactions, wherein the conditional statement indicates that when a user action exceeds the threshold associated with the group baseline, the one or more reactions are initiated. In one aspect of an embodiment, the method may further comprise receiving, by the incident response server, a second set of data from a second user device; processing, by the incident response server, the second set of data to identify an action; and determining, by the incident response server, that the incident response trap is triggered when the action exceeds the threshold associated with the group baseline, wherein the one or more reactions are initiated. In one aspect of an embodiment, the method may further comprise generating, by the incident response server, a notification comprising information associated with the action, the threshold, and the group baseline; and facilitating, by the incident response server, presentation of the notification to an administrator of the data exchange layer system. In one aspect of an embodiment, the set of data from each of the plurality of user devices may be aggregated by the plurality of broker servers.

In another embodiment, a method may comprise configuring, by an incident response server, a data collector that will collect data on a user device where the data collector is stored; transmitting, by the incident response server, a copy of the data collector to a plurality of user devices through a data exchange layer system, wherein the data exchange layer system comprises a plurality of broker servers, each associated with a respective portion of the plurality of user devices; transmitting, by the incident response server, a request for a set of data from the data exchange layer system; and receiving, by the incident response server, the set of data from at least a subset of the plurality of broker servers, wherein the set of data is obtained from the respective copies of the data collector of a subset of user devices associated with the subset of the plurality of broker servers.

In one aspect of an embodiment, the method may further comprise generating, by the incident response server, a group baseline associated with a group of user devices based on the data received; and configuring, by the incident response server, a threshold associated with the group baseline. In one aspect of an embodiment, the method may further comprise receiving, by the incident response server, a second set of data from a second user device; processing, by the incident response server, the second set of data to identify an action; determining, by the incident response server, that the action exceeds the threshold associated with the group baseline; generating, by the incident response server, a notification comprising information associated with the action, the threshold, and the group baseline; and facilitating, by the incident response server, presentation of the notification to an administrator of the data exchange layer system. In one aspect of an embodiment, configuring the data collector that will collect data executing on the user device where it is stored may further comprise configuring, by the incident response server, the data collector to generate a local cache of data based on data collected by the data collector and stored on the user device on which the data collector is stored. In one aspect of an embodiment, the set of data from at least the subset of user devices may comprise information from each of the subset of user devices and aggregated by the plurality of broker servers. In one aspect of an embodiment, the method may further comprise generating, by the incident response server, the request for the set of data from the data exchange layer, where in the request comprises a specification of a topic associated with the subset of user devices. In one aspect of an embodiment, the topic is a category or parameter by which user devices are grouped or identified.

In embodiment a system may include at least one memory storing computer-executable instructions; and at least one processor, wherein the at least one processor is configured to access the at least one memory and to execute the computer-executable instructions to configure a data collector that will collect data on a user device where the data collector is stored; transmit a copy of the data collector to a plurality of user devices through a data exchange layer system, wherein the data exchange layer system comprises a plurality of broker servers, each associated with a respective portion of the plurality of user devices; transmit a request for a set of data from the data exchange layer system; and receive the set of data from at least a subset of the plurality of broker servers, wherein the set of data is obtained from the respective copies of the data collector of a subset of user devices associated with the subset of the plurality of broker servers.

In one aspect of an embodiment, the at least one processor may be further configured to generate a group baseline associated with a group of user devices based on the data received; and configure a threshold associated with the group baseline. In one aspect of an embodiment, the at least one processor may be further configured to receive a second set of data from a second user device; process the second set of data to identify an action; determine that the action exceeds the threshold associated with the group baseline; generate a notification comprising information associated with the action, the threshold, and the group baseline; and facilitate presentation of the notification to an administrator of the data exchange layer system. In one aspect of an embodiment, to configure the data collector that will collect data executing on a user device where it is stored, the at least one processor may be further configured to configure the data collector to generate a local cache of data based on data collected by the data collector and stored on the user device on which the data collector is stored. In one aspect of an embodiment, the set of data from at least the subset of user devices may comprise information from each of the subset of user devices and aggregated by the plurality of broker servers. In one aspect of an embodiment, the at least one processor may be further configured to generate the request for the set of data from the data exchange layer, where in the request comprises a specification of a topic associated with the subset of user devices. In one aspect of an embodiment, the topic may be a category or parameter by which user devices are grouped or identified.

In one embodiment, a server may comprise at least one memory storing computer-executable instructions; and at least one processor, wherein the at least one processor is configured to access the at least one memory and to execute the computer-executable instructions to configure a data collector that will collect data on a user device where the data collector is stored; transmit a copy of the data collector to a plurality of user devices through a data exchange layer system, wherein the data exchange layer system comprises a plurality of broker servers, each associated with a respective portion of the plurality of user devices; transmit a request for a set of data from the data exchange layer system; and receive the set of data from at least a subset of the plurality of broker servers, wherein the set of data is obtained from the respective copies of the data collector of a subset of user devices associated with the subset of the plurality of broker servers.

In one aspect of an embodiment, the at least one processor may be further configured to generate a group baseline associated with a group of user devices based on the data received; and configure a threshold associated with the group baseline. In one aspect of an embodiment, the at least one processor may be further configured to receive a second set of data from a second user device; process the second set of data to identify an action; determine that the action exceeds the threshold associated with the group baseline; generate a notification comprising information associated with the action, the threshold, and the group baseline; and facilitate presentation of the notification to an administrator of the data exchange layer system. In one aspect of an embodiment, to configure the data collector that will collect data executing on a user device where it is stored, the at least one processor may be further configured to configure the data collector to generate a local cache of data based on data collected by the data collector and stored on the user device on which the data collector is stored. In one aspect of an embodiment, the set of data from at least the subset of user devices may comprise information from each of the subset of user devices and aggregated by the plurality of broker servers. In one aspect of an embodiment, the at least one processor may be further configured to generate the request for the set of data from the data exchange layer, where in the request comprises a specification of a topic associated with the subset of user devices. In one aspect of an embodiment, the topic may be a category or parameter by which user devices are grouped or identified.

In one embodiment, a system may comprise a means for configuring a data collector that will collect data on a user device where the data collector is stored; a means for transmitting a copy of the data collector to a plurality of user devices through a data exchange layer system, wherein the data exchange layer system comprises a plurality of broker servers, each associated with a respective portion of the plurality of user devices; a means for transmitting a request for a set of data from the data exchange layer system; and a means for receiving the set of data from at least a subset of the plurality of broker servers, wherein the set of data is obtained from the respective copies of the data collector of a subset of user devices associated with the subset of the plurality of broker servers.

In one aspect of an embodiment, the system may further comprise a means for generating a group baseline associated with a group of user devices based on the data received; and a means for configuring a threshold associated with the group baseline. In one aspect of an embodiment, the system may further comprise a means for receiving a second set of data from a second user device; a means for processing the second set of data to identify an action; a means for determining that the action exceeds the threshold associated with the group baseline; a means for generating a notification comprising information associated with the action, the threshold, and the group baseline; and a means for facilitating presentation of the notification to an administrator of the data exchange layer system. In one aspect of an embodiment, configuring the data collector that will collect data executing on the user device where it is stored may further comprise a means for configuring the data collector to generate a local cache of data based on data collected by the data collector and stored on the user device on which the data collector is stored. In one aspect of an embodiment, the set of data from at least the subset of user devices may comprise information from each of the subset of user devices and aggregated by the plurality of broker servers. In one aspect of an embodiment, the system may further comprise a means for generating the request for the set of data from the data exchange layer, where in the request comprises a specification of a topic associated with the subset of user devices. In one aspect of an embodiment, the topic may be a category or parameter by which user devices are grouped or identified.

In one embodiment, a computer-readable medium may store computer-executable instructions which, when executed by a processor, cause the processor to perform operations comprising configuring, by an incident response server, an incident response trap comprising one or more conditional statements; associating, by the incident response server, the incident response trap with one or more reactions; facilitating, by the incident response server, propagation of the incident response trap to user devices via a data exchange layer system comprising a plurality of broker servers, each associated with a plurality of user devices; receiving, by the incident response server, a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and facilitating, by the incident response server, presentation of the notification to an administrator of the data exchange layer system.

In one aspect of an embodiment, the operations may further comprise configuring, by the incident response server, a data collector that will collect data on a user device where the data collector is stored; and transmitting, by the incident response server, a copy of the data collector to the user devices through the data exchange layer system. In one aspect of an embodiment, the operations may further comprise receiving, by the incident response server, data collected by a subset of the user devices, wherein each of the subset of user devices executed a respective copy of the data collector and generates a respective local cache. In one aspect of an embodiment, the operations may further comprise generating, by the incident response server, a group baseline based on the data collected by the subset of the user devices. In one aspect of an embodiment, the one or more conditional statements of the incident response trap may be associated with file, network, process, or registry activity of at least one of the user devices. In one aspect of an embodiment, the operations may further comprise initiating, by the incident response server, a request for a set of data through the data exchange layer system; and receiving, by the incident response server, the set of data from a subset of user devices through the data exchange layer system, wherein the subset of user devices is determined by an association of a topic with the subset of user devices. In one aspect of an embodiment, the operations may further comprise generating, by the incident response server, a report based at least in part on the data received from the subset of user devices. In one aspect of an embodiment, the topic may be a category or parameter by which user devices are grouped or identified.

In one embodiment, a method may comprise configuring, by an incident response server, an incident response trap comprising one or more conditional statements; associating, by the incident response server, the incident response trap with one or more reactions; facilitating, by the incident response server, propagation of the incident response trap to user devices via a data exchange layer system comprising a plurality of broker servers, each associated with a plurality of user devices; receiving, by the incident response server, a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and facilitating, by the incident response server, presentation of the notification to an administrator of the data exchange layer system.

In one aspect of an embodiment, the method may further comprise configuring, by the incident response server, a data collector that will collect data on a user device where the data collector is stored; and transmitting, by the incident response server, a copy of the data collector to the user devices through the data exchange layer system. In one aspect of an embodiment, the method may further comprise receiving, by the incident response server, data collected by a subset of the user devices, wherein each of the subset of user devices executed a respective copy of the data collector and generates a respective local cache. In one aspect of an embodiment, the method may further comprise generating, by the incident response server, a group baseline based on the data collected by the subset of the user devices. In one aspect of an embodiment, the one or more conditional statements of the incident response trap may be associated with file, network, process, or registry activity of at least one of the user devices. In one aspect of an embodiment, the method may further comprise initiating, by the incident response server, a request for a set of data through the data exchange layer system; and receiving, by the incident response server, the set of data from a subset of user devices through the data exchange layer system, wherein the subset of user devices is determined by an association of a topic with the subset of user devices. In one aspect of an embodiment, the method may further comprise generating, by the incident response server, a report based at least in part on the data received from the subset of user devices. In one aspect of an embodiment, the topic may be a category or parameter by which user devices are grouped or identified.

In one embodiment, a server may comprise at least one memory storing computer-executable instructions; and at least one processor, wherein the at least one processor is configured to access the at least one memory and to execute the computer-executable instructions to configure an incident response trap comprising one or more conditional statements; associate the incident response trap with one or more reactions; facilitate propagation of the incident response trap to user devices via a data exchange layer system comprising a plurality of broker servers, each associated with a plurality of user devices; receive a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and facilitate presentation of the notification to an administrator of the data exchange layer system.

In one aspect of an embodiment, the at least one processor may be further configured to execute the computer-executable instructions to configure a data collector that will collect data on a user device where the data collector is stored; and transmit a copy of the data collector to the user devices through the data exchange layer system. In one aspect of an embodiment, the at least one processor may be further configured to execute the computer-executable instructions to configure receive data collected by a subset of the user devices, wherein each of the subset of user devices executed a respective copy of the data collector and generates a respective local cache. In one aspect of an embodiment, the at least one processor may be further configured to execute the computer-executable instructions to configure generating, by the incident response server, a group baseline based on the data collected by the subset of the user devices. In one aspect of an embodiment, the one or more conditional statements of the incident response trap may be associated with file, network, process, or registry activity of at least one of the user devices. In one aspect of an embodiment, the at least one processor may be further configured to execute the computer-executable instructions to initiate a request for a set of data through the data exchange layer system; and receive the set of data from a subset of user devices through the data exchange layer system, wherein the subset of user devices is determined by an association of a topic with the subset of user devices. In one aspect of an embodiment, the at least one processor may be further configured to execute the computer-executable instructions to generate a report based at least in part on the data received from the subset of user devices. In one aspect of an embodiment, the topic may be a category or parameter by which user devices are grouped or identified.

In one embodiment, a system may comprise a means for configuring an incident response trap comprising one or more conditional statements; a means for associating, by the incident response server, the incident response trap with one or more reactions; a means for facilitating propagation of the incident response trap to user devices via a data exchange layer system comprising a plurality of broker servers, each associated with a plurality of user devices; a means for receiving a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and a means for facilitating presentation of the notification to an administrator of the data exchange layer system.

In one aspect of an embodiment, the system may further comprise a means for configuring a data collector that will collect data on a user device where the data collector is stored; and a means for transmitting a copy of the data collector to the user devices through the data exchange layer system. In one aspect of an embodiment, the system may further comprise a means for receiving data collected by a subset of the user devices, wherein each of the subset of user devices executed a respective copy of the data collector and generates a respective local cache. In one aspect of an embodiment, the system may further comprise a means for generating a group baseline based on the data collected by the subset of the user devices. In one aspect of an embodiment, the one or more conditional statements of the incident response trap may be associated with file, network, process, or registry activity of at least one of the user devices. In one aspect of an embodiment, the system may further comprise a means for initiating a request for a set of data through the data exchange layer system; and a means for receiving the set of data from a subset of user devices through the data exchange layer system, wherein the subset of user devices is determined by an association of a topic with the subset of user devices. In one aspect of an embodiment, the system may further comprise a means for generating a report based at least in part on the data received from the subset of user devices. In one aspect of an embodiment, the topic may be a category or parameter by which user devices are grouped or identified.

In one embodiment, a computer-readable medium may store computer-executable instructions which, that when executed by a processor, cause the processor to perform operations comprising configuring, by an incident response server, a data collector that will collect data on a user device where the data collector is stored; transmitting, by the incident response server, a copy of the data collector to a plurality of user devices associated with a group through a data exchange layer system, wherein the data exchange layer system comprises a plurality of broker servers, each associated with a respective portion of the plurality of user devices; receiving, by the incident response server through the data exchange layer system, a set of data from each of the plurality of user devices via a subset of the plurality of broker servers, wherein the set of data is obtained from the respective copies of the data collector of each of the plurality of user devices; generating, by the incident response server, a group baseline associated with the group based on the set of data from each of the plurality of user devices; and configuring, by the incident response server, a threshold associated with the group baseline.

In one aspect of an embodiment, the operations may further comprise configuring, by the incident response server, an incident response trap comprising a conditional statement and one or more reactions, wherein the conditional statement indicates that when a user action exceeds the threshold associated with the group baseline, the one or more reactions are initiated. In one aspect of an embodiment, the operations may further comprise receiving, by the incident response server, a second set of data from a second user device; processing, by the incident response server, the second set of data to identify an action; and determining, by the incident response server, that the incident response trap is triggered when the action exceeds the threshold associated with the group baseline, wherein the one or more reactions are initiated. In one aspect of an embodiment, the operations may further comprise generating, by the incident response server, a notification comprising information associated with the action, the threshold, and the group baseline; and facilitating, by the incident response server, presentation of the notification to an administrator of the data exchange layer system. In one aspect of an embodiment, the set of data from each of the plurality of user devices may be aggregated by the plurality of broker servers.

In one embodiment, a system may comprise a means for configuring a data collector that will collect data on a user device where the data collector is stored; a means for transmitting a copy of the data collector to a plurality of user devices associated with a group through a data exchange layer system, wherein the data exchange layer system comprises a plurality of broker servers, each associated with a respective portion of the plurality of user devices; a means for receiving, through the data exchange layer system, a set of data from each of the plurality of user devices via a subset of the plurality of broker servers, wherein the set of data is obtained from the respective copies of the data collector of each of the plurality of user devices; a means for generating a group baseline associated with the group based on the set of data from each of the plurality of user devices; and a means for configuring a threshold associated with the group baseline.

In one aspect of an embodiment, the system may comprise a means for configuring an incident response trap comprising a conditional statement and one or more reactions, wherein the conditional statement indicates that when a user action exceeds the threshold associated with the group baseline, the one or more reactions are initiated. In one aspect of an embodiment, the system may comprise a means for receiving a second set of data from a second user device; a means for processing the second set of data to identify an action; and a means for determining that the incident response trap is triggered when the action exceeds the threshold associated with the group baseline, wherein the one or more reactions are initiated. In one aspect of an embodiment, the system may comprise a means for generating a notification comprising information associated with the action, the threshold, and the group baseline; and a means for facilitating presentation of the notification to an administrator of the data exchange layer system. In one aspect of an embodiment, the set of data from each of the plurality of user devices may be aggregated by the plurality of broker servers.

In one embodiment, a system may comprise at least one memory storing computer-executable instructions; and at least one processor, wherein the at least one processor is configured to access the at least one memory and to execute the computer-executable instructions to configure a data collector that will collect data on a user device where the data collector is stored; transmit a copy of the data collector to a plurality of user devices associated with a group through a data exchange layer system, wherein the data exchange layer system comprises a plurality of broker servers, each associated with a respective portion of the plurality of user devices; receive, through the data exchange layer system, a set of data from each of the plurality of user devices via a subset of the plurality of broker servers, wherein the set of data is obtained from the respective copies of the data collector of each of the plurality of user devices; generate a group baseline associated with the group based on the set of data from each of the plurality of user devices; and configure a threshold associated with the group baseline.

In one aspect of an embodiment, the at least one processor may be further configured to execute the computer-executable instructions to configure an incident response trap comprising a conditional statement and one or more reactions, wherein the conditional statement indicates that when a user action exceeds the threshold associated with the group baseline, the one or more reactions are initiated. In one aspect of an embodiment, the at least one processor may be further configured to execute the computer-executable instructions to receive a second set of data from a second user device; process the second set of data to identify an action; and determine that the incident response trap is triggered when the action exceeds the threshold associated with the group baseline, wherein the one or more reactions are initiated. In one aspect of an embodiment, the at least one processor may be further configured to execute the computer-executable instructions to generate a notification comprising information associated with the action, the threshold, and the group baseline; and facilitate presentation of the notification to an administrator of the data exchange layer system. In one aspect of an embodiment, the set of data from each of the plurality of user devices may be aggregated by the plurality of broker servers.

In one embodiment, a server may comprise at least one memory storing computer-executable instructions; and at least one processor, wherein the at least one processor is configured to access the at least one memory and to execute the computer-executable instructions to configure a data collector that will collect data on a user device where the data collector is stored; transmit a copy of the data collector to a plurality of user devices associated with a group through a data exchange layer system, wherein the data exchange layer system comprises a plurality of broker servers, each associated with a respective portion of the plurality of user devices; receive, through the data exchange layer system, a set of data from each of the plurality of user devices via a subset of the plurality of broker servers, wherein the set of data is obtained from the respective copies of the data collector of each of the plurality of user devices; generate a group baseline associated with the group based on the set of data from each of the plurality of user devices; and configure a threshold associated with the group baseline.

In one aspect of an embodiment, the at least one processor may be further configured to execute the computer-executable instructions to configure an incident response trap comprising a conditional statement and one or more reactions, wherein the conditional statement indicates that when a user action exceeds the threshold associated with the group baseline, the one or more reactions are initiated. In one aspect of an embodiment, the at least one processor may be further configured to execute the computer-executable instructions to receive a second set of data from a second user device; process the second set of data to identify an action; and determine that the incident response trap is triggered when the action exceeds the threshold associated with the group baseline, wherein the one or more reactions are initiated. In one aspect of an embodiment, the at least one processor may be further configured to execute the computer-executable instructions to generate a notification comprising information associated with the action, the threshold, and the group baseline; and facilitate presentation of the notification to an administrator of the data exchange layer system. In one aspect of an embodiment, the set of data from each of the plurality of user devices may be aggregated by the plurality of broker servers.

Conclusion

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 104, broker 106, incident response server 108), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 104, broker 106, incident response server 108, etc.) may include alternate and/or additional hardware, software, or firmware components beyond those described or depicted without departing from the scope of the disclosure. More particularly, it should be appreciated that software, firmware, or hardware components depicted as forming part of the device (e.g., user device 104, broker 106, incident response server 108, etc.) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 300-600 may have been described above as being performed by one or more components of a device, or more specifically, by one or more one or more program modules executing on such a device. It should be appreciated, however, that any of the operations of methods 300-600 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 300 may be described in the context of the illustrative user device 600, it should be appreciated that such operations may be implemented in connection with numerous other system configurations.

The operations described and depicted in the illustrative methods of FIG. 3-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A non-transitory computer-readable medium storing computer-executable instructions which, when executed by a processor, cause the processor to perform operations comprising:

configuring, by an incident response server, a data collector that will collect data on a user device where the data collector is stored;

transmitting, by the incident response server, a copy of the data collector to a plurality of user devices through a data exchange layer system, wherein the data exchange layer system comprises a plurality of broker servers, each associated with a respective portion of the plurality of user devices;

transmitting, by the incident response server, a request for a set of data from the data exchange layer system;

receiving, by the incident response server, the set of data from at least a subset of the plurality of broker servers, wherein the set of data is obtained from the respective copies of the data collector of a subset of user devices associated with the subset of the plurality of broker servers and generating, by the incident response server, a group baseline associated with a group of user devices based on the data received; and configuring, by the incident response server, a threshold associated with the group baseline.

2. The non-transitory computer-readable medium of claim 1, wherein the operations further comprise:

receiving, by the incident response server, a second set of data from a second user device;

processing, by the incident response server, the second set of data to identify an action;
determining, by the incident response server, that the action exceeds the threshold associated with the group baseline;
generating, by the incident response server, a notification comprising information associated with the action, the threshold, and the group baseline; and
facilitating, by the incident response server, presentation of the notification to an administrator of the data exchange layer system.

3. The non-transitory computer-readable medium of claim 1, wherein configuring the data collector that will collect data executing on a user device where it is stored further comprises:
configuring, by the incident response server, the data collector to generate a local cache of data based on data collected by the data collector and stored on the user device on which the data collector is stored.

4. The non-transitory computer-readable medium of claim 1, wherein the set of data from at least the subset of user devices comprises information from each of the subset of user devices and aggregated by the plurality of broker servers.

5. The non-transitory computer-readable medium of claim 1, wherein the operations further comprise:
generating, by the incident response server, the request for the set of data from the data exchange layer, where in the request comprises a specification of a topic associated with the subset of user devices.

6. The non-transitory computer-readable medium of claim 5, wherein the topic is a category or parameter by which user devices are grouped or identified.

7. A system comprising:
at least one memory storing computer-executable instructions; and
at least one processor, wherein the at least one processor is configured to access the at least one memory and to execute the computer-executable instructions to:
configure an incident response trap comprising one or more conditional statements;
associate the incident response trap with one or more reactions;
facilitate propagation of the incident response trap to user devices via a data exchange layer system comprising a plurality of broker servers, each associated with a plurality of user devices;
receive a notification from at least one user device of the plurality of user devices in response to the incident response trap being triggered and at least one of the one or more reactions executing on the at least one user device, wherein the notification comprises a first data associated with the incident response trap and the executed at least one of the one or more reactions; and
facilitate presentation of the notification to an administrator of the data exchange layer system.

8. The system of claim 7, wherein the at least one processor is further configured to execute the computer-executable instructions to:
configure a data collector that will collect data on a user device where the data collector is stored; and
transmit a copy of the data collector to the user devices through the data exchange layer system.

9. The system of claim 8, wherein the at least one processor is further configured to execute the computer-executable instructions to:
receive data collected by a subset of the user devices, wherein each of the subset of user devices executed a respective copy of the data collector and generates a respective local cache.

10. The system of claim 9, wherein the at least one processor is further configured to execute the computer-executable instructions to:
generating, by the incident response server, a group baseline based on the data collected by the subset of the user devices.

11. The system of claim 7, wherein the one or more conditional statements of the incident response trap is associated with file, network, process, or registry activity of at least one of the user devices.

12. The system of claim 7, wherein the at least one processor is further configured to execute the computer-executable instructions to:
initiate a request for a set of data through the data exchange layer system; and
receive the set of data from a subset of user devices through the data exchange layer system, wherein the subset of user devices is determined by an association of a topic with the subset of user devices.

13. The system of claim 12, wherein the at least one processor is further configured to execute the computer-executable instructions to:
generate a report based at least in part on the data received from the subset of user devices.

14. The system of claim 12, wherein the topic is a category or parameter by which user devices are grouped or identified.

15. A method comprising:
configuring, by an incident response server, a data collector that will collect data on a user device where the data collector is stored;
transmitting, by the incident response server, a copy of the data collector to a plurality of user devices associated with a group through a data exchange layer system, wherein the data exchange layer system comprises a plurality of broker servers, each associated with a respective portion of the plurality of user devices;
receiving, by the incident response server through the data exchange layer system, a set of data from each of the plurality of user devices via a subset of the plurality of broker servers, wherein the set of data is obtained from the respective copies of the data collector of each of the plurality of user devices;
generating, by the incident response server, a group baseline associated with the group based on the set of data from each of the plurality of user devices; and
configuring, by the incident response server, a threshold associated with the group baseline.

16. The method of claim 15, further comprising:
configuring, by the incident response server, an incident response trap comprising a conditional statement and one or more reactions, wherein the conditional statement indicates that when a user action exceeds the threshold associated with the group baseline, the one or more reactions are initiated.

17. The method of claim 16, further comprising:
receiving, by the incident response server, a second set of data from a second user device;
processing, by the incident response server, the second set of data to identify an action; and
determining, by the incident response server, that the incident response trap is triggered when the action exceeds the threshold associated with the group baseline, wherein the one or more reactions are initiated.

18. The method of claim 17, further comprising:

generating, by the incident response server, a notification comprising information associated with the action, the threshold, and the group baseline; and facilitating, by the incident response server, presentation of the notification to an administrator of the data exchange layer system.

19. The method of claim 15, wherein the set of data from each of the plurality of user devices is aggregated by the plurality of broker servers.

* * * * *